United States Patent [19]

Wilson

[11] 3,860,816
[45] Jan. 14, 1975

[54] PORTABLE ENVIRONMENTAL CALIBRATORS FOR COMPENSATED DENSITY LOGGING INSTRUMENTS

[75] Inventor: Billy F. Wilson, Houston, Tex.
[73] Assignee: Dresser Industries, Inc., Dallas, Tex.
[22] Filed: Mar. 1, 1971
[21] Appl. No.: 119,697

[52] U.S. Cl. .............................................. 250/252
[51] Int. Cl. ........................ G12b 13/00, G01v 5/00
[58] Field of Search ........................... 250/83 C, 252

[56] References Cited
UNITED STATES PATENTS

| | | | |
|---|---|---|---|
| 2,978,585 | 4/1961 | Rabson | 250/83 C |
| 3,122,636 | 2/1964 | Fryer | 250/83 C |
| 3,435,215 | 3/1969 | Pritchett | 250/83 C |

Primary Examiner—Archie R. Borchelt
Attorney, Agent, or Firm—Eddie E. Scott

[57] ABSTRACT

Two calibration blocks that are small enough to be carried to the field are used to calibrate a compensated density logging system. Each block has a central cavity filled with a combination of metal filters. The well-known spine-and-ribs plot may be duplicated with three simple and quick measurements using the two calibration blocks.

9 Claims, 4 Drawing Figures

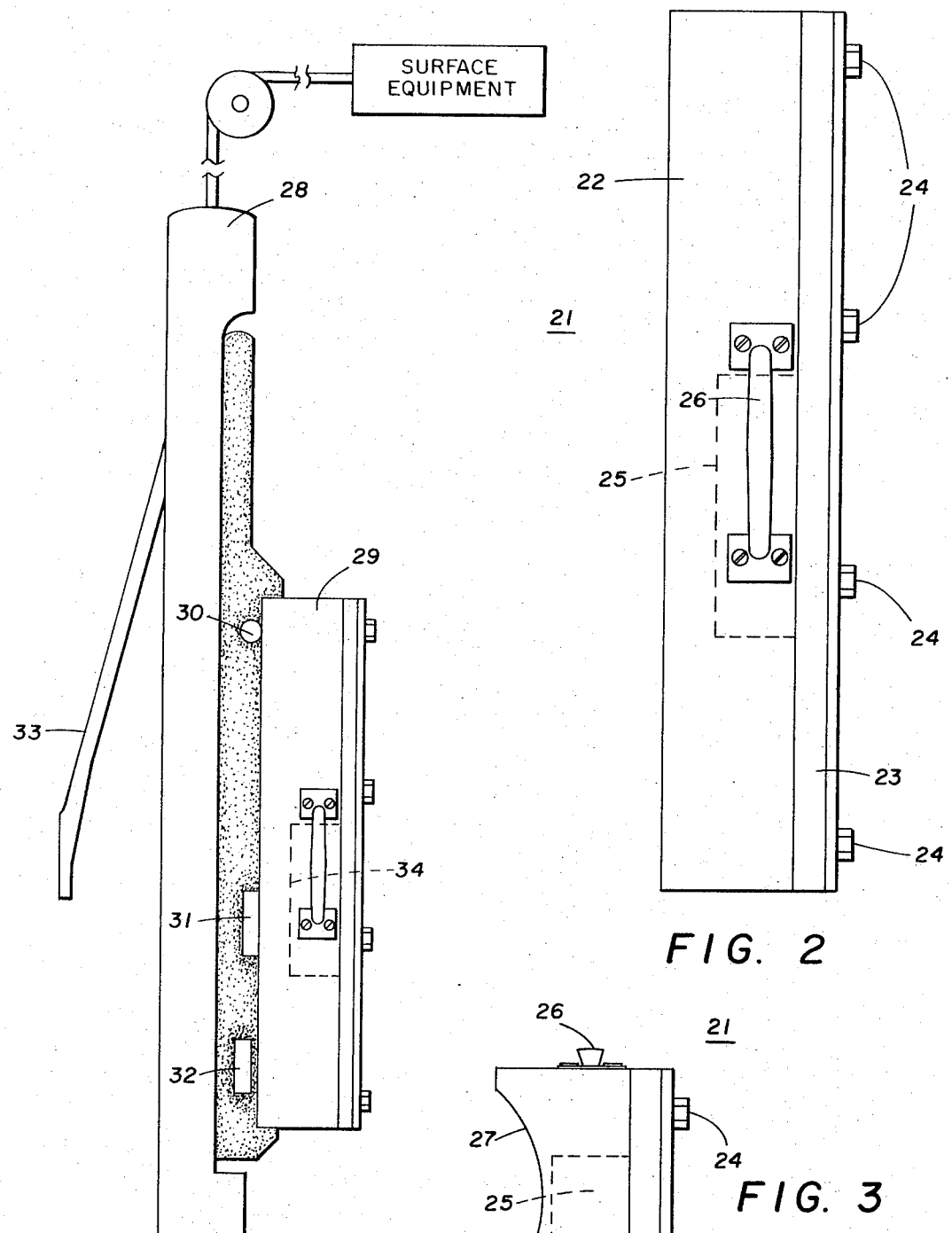

PORTABLE ENVIRONMENTAL CALIBRATORS FOR COMPENSATED DENSITY LOGGING INSTRUMENTS

BACKGROUND OF THE INVENTION

The present invention relates to the art of radioactivity well logging and more particularly to the calibration of a compensated density logging instrument.

Compensated density logging is a system of logging wherein the effects of mudcake and extraneous radiation are overcome. The compensated density logging instrument includes a gamma ray source and two individual gamma detectors spaced at predetermined distances from the gamma ray source so that one of the detectors is primarily sensitive to gamma rays which have been scattered in the mudcake and the other detector is primarily sensitive to gamma rays which have been scattered in the formations. The outputs of the two detectors are compared to provide a log representing formation density.

In order to provide a log that may be correctly interpreted, the compensated density logging instrument must be calibrated. A number of variable factors influence the log produced by a compensated density logging instrument. Examples of these variable factors are: (A) the source strength of individual compensated density logging instruments are different, (B) the sensitivity of the various detectors will be different, (C) the mud density varies from well to well, and (D) the size of the well bore varies.

Ideally, calibration should be conducted at the well site. In order for this to be accomplished, small calibrators that are easy to transport and handle must be provided. Environmental calibration systems of the prior art have generally been large and heavy and impossible to transport with the compensated density logging instrument.

DESCRIPTION OF THE PRIOR ART.

A compensated density logging instrument is shown in U.S. Pat. No. 3,321,625 to J. S. Wahl, patented May 23, 1967. A low energy gamma ray source, preferably of cesium, is located in a recess in the instrument. The source is positioned one-half to two inches back from the outer edge of the recess. The source is shielded to collimate and direct gamma rays into the formations. A first detector is mounted slightly beyond the crossover distance and immediately adjacent the face of the instrument. A second partially shielded detector is positioned at a greater distance from the cross-over distance and mounted about one-to-two inches from the face of the instrument.

The first detector will have a relatively shallow depth of sampling and, therefore, will be strongly affected by gamma rays which have been scattered in the mudcake. The second detector will have a greater depth of sampling and is collimated. The second detector will, therefore, be primarily affected by gamma rays which have been scattered in the formations. By comparing the signals from the two detectors, a log is produced which accurately and reliably indicates the density of the formations free from the effects of mudcake.

Prior art calibration of compensated density logging instruments is summarized in GAMMA-GAMMA DENSITY LOGGING, *The Log Analyst*, pp. 31–36, November-December 1967. In general, the calibration falls in three general categories. The first is calibration in test pits. This system has the limitation that the test pits are located at the manufacturer's plant and the instruments can not be calibrated at the well site. The second system is an "office check" using an aluminum block. The aluminum block also has the disadvantage of being too large to be carried to the field. The aluminum block generally weighs in excess of 600 lbs. The third system is a system that may be used at the well site. It consists of two gamma ray sources, one positioned opposite each detector. Each calibration source has two slides. With both slides out, the sources duplicate the counting rate obtained from material with a bulk density of 2.1 gm/cc (and zero compensation). With one slide in, a counting rate equivalent to 2.6 gm/cc (zero compensation) is obtained. With both slides in, a counting rate equivalent to 2.5gm/cc (−0.1gm/cc compensation) is obtained. The disadvantages of this system are that it does not check the entire system since the calibration is done without using the logging instruments gamma ray source and that this system requires the compensated density logging instrument and the calibrators to always be used as a set.

SUMMARY OF THE INVENTION

The present invention provides environmental calibrators for a compensated density logging system that may easily be carried to the well site and that provides a complete calibration of the compensated density logging system. The calibrators are compact and durable and, therefore, are ideal for use under well logging conditions. The calibrators are not limited to use with one individual instrument but may be used interchangeably with different compensated density logging instruments.

When calibrating a compensated density logging system, it is necessary to find two points that fall on the spine or line of zero correction and a third point that falls off the spine. The third point is used to set the rib angle. Previously, only a block large enough to look infinite to the instrument would provide points that fall on the spine. The present invention provides small calibrators, not large enough to be an infinite medium, that will give points that fall on the spine and a point to set the rib angle.

The calibrators include an internal cavity containing filter materials. The calibrators are sequentially positioned on the compensated density logging instrument and the required points established.

It is therefore an object of the present invention to provide calibration of a compensated density logging instrument.

It is a further object of the present invention to provide calibrators for a compensated density logging instrument that are small enough to be used at the well site.

It is a still further object of the present invention to provide calibrators for a compensated density logging system that will provide calibration of the entire system.

It is a still further object of the present invention to provide compact and durable calibrators for a compensated density logging instrument.

The above and other objects and advantages of the present invention will become apparent from a consideration of the following detailed description of the invention when taken in conjunction with the accompanying drawing.

BRIEF DESCRIPTION OF THE DRAWINGS

FIG. 2 shows a side view of a calibrator of the present invention.

FIG. 3 shows an end view of the calibrator shown in FIG. 2.

FIG. 4 shows a calibrator positioned on a compensated density well logging instrument in position for calibration.

DETAILED DESCRIPTION OF THE INVENTION

Figure 1:
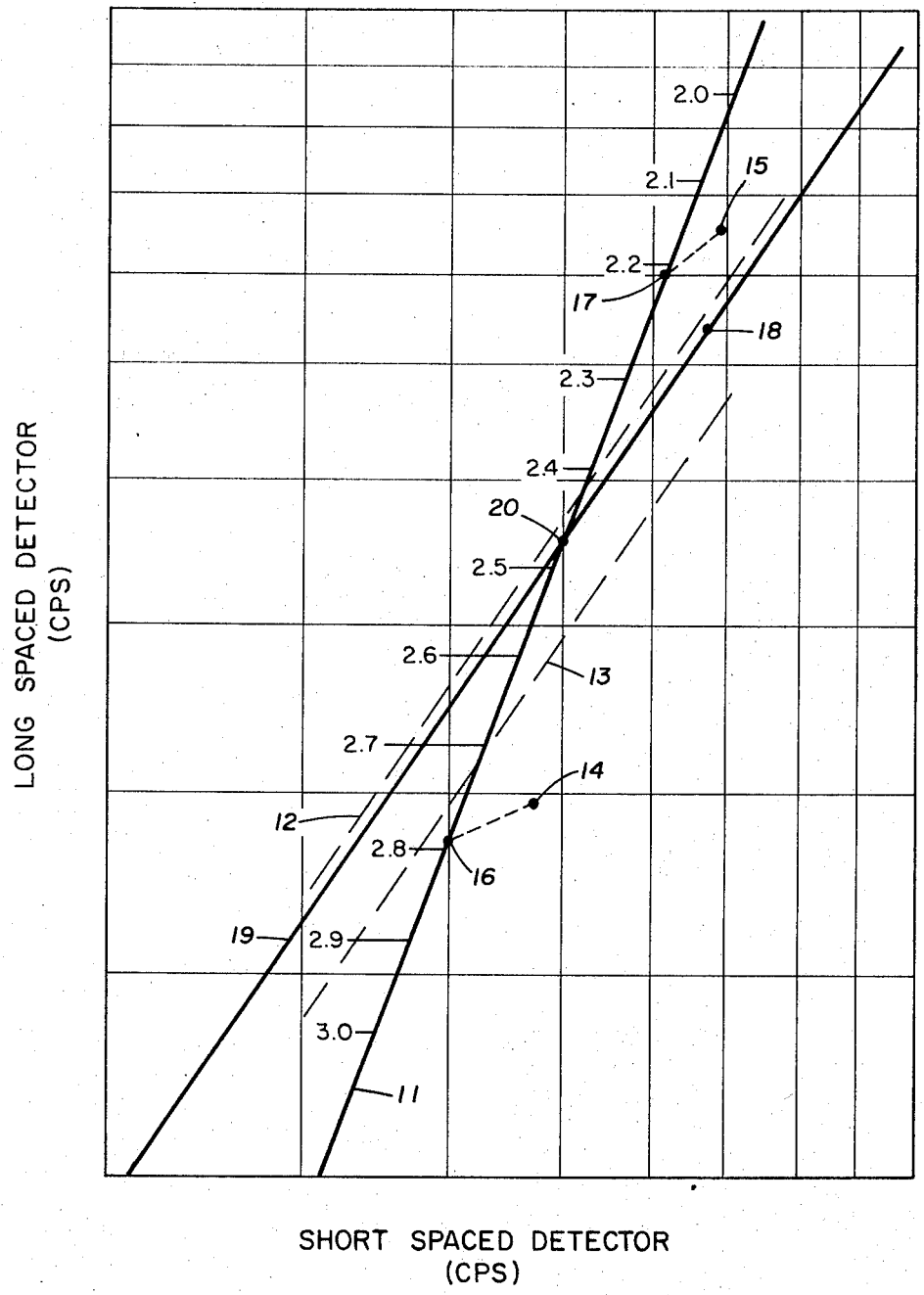
FIG. 1 is a spine and ribs plot showing points located with calibrators constructed in accordance with the present invention.

Referring now to FIG. 1, a spine-and-ribs plot of the long-spaced counting rate as a function of the short-spaced counting rate is shown on log-log paper. This type of plot has become well known in the art and is set forth in greater detail in the paper by Wahl et al. entitled "The Dual Spacing Formation Density Log" published in the *Journal of Petroleum Technology*, December 1964 and in U.S. Pat. Application Ser. No. 883,539, now U.S. Pat. No. 3,654,470, titled "Apparatus for Compensated Density Logging" to Billy F. Wilson. The plot shown in FIG. 1 is derived from testing a compensated density logging instrument in a test well or test pit where the physical properties of the formations are accurately known. The line 11, or the spine, is determined by plotting the long-spaced detector counting rate versus the short-spaced detector counting rate for formation materials having different densities (2.0 to 3.0 gm/cc.). The lines 12 and 13, or ribs, are derived by making measurements in the same formations that were used to derive the spine, but with the density pad of the logging instrument spaced away from the formations by mudcakes of known thickness and density. The ribs are thus determined by data points extending from the thickest, high density mudcake down to zero mudcake thickness (on the spine) and then extending on to the thickest low density mudcake. The spine-and-rib plot gives the response of the compensated density logging instrument to changes in formation density and changes in mudcake thickness and mudcake density.

The environmental calibrators of the present invention make possible the duplication of the spine-and-ribs plot with three quick measurements. The three measurements will establish two points that fall on the spine and one point for setting the rib angle. The calibrators consist of a metal body having an internal cavity that contains certain filter materials. For example, one calibrator may be constructed of aluminum and another of magnesium.

Referring again to FIG. 1, point 14 reflects the detector responses when a solid aluminum block the size of the calibrators of the present invention is measured by the compensated density logging instrument. Point 15 represents the detector responses when a solid magnesium block the size of the calibrators of the present invention is measured by the compensated density logging instrument. It can be appreciated that points 14 and 15 would not contribute to an accurate calibration of the measuring instrument because they do not lie on the spine 11. The calibrators of the present invention are constructed so that the detector responses are moved over to spine 11, thereby providing an accurate calibration system. The aluminum calibrator is constructed so that it will give a point 16 (2.80 gm/cc) on the spine near the high density end of the density logging scale. The magnesium calibrator is constructed so that it will give a point 17 (2.20 gm/cc) on the spine near the low density end of the density scale. A line drawn through these two points will give the same spine 11 as was obtained in the test pits.

Once points 16 and 17 and the spine 11 have been established one of the calibrators is moved to a 180° reversed position to provide a point whereby the rib angle may be established. For example, the magnesium calibrator is reversed on the compensated density logging instrument and a point 18 established. The point 18 establishes a rib 19 that intersects the spine at a fixed point 20 (2.48 gm/cc). Point 20 is first established at the test well or test pit by plotting one or more ribs such as ribs 12 and 13. Since the ribs are known to be straight and parallel, a line through point 18, parallel to ribs 12 and 13 establishes rib 19 and rib 19 intersects spine 11 at point 20 (2.48 gm/cc). During actual calibration of a compensated density logging instrument, the rib may be established by simply plotting point 18 and drawing a line between point 18 and the point at 2.48 gm/cc (point 20) on the density scale.

A side view of one of the calibrators of the present invention is shown in FIG. 2, with the calibrator indicated generally at 21 and an end view of calibrator 21 is shown in FIG. 3. The body 22 of calibrator 21 is entirely constructed of aluminum. A removable cover 23 is connected to body 22 and held in place by a series of bolts 24. Located near the center of calibrator 21 is a cavity 25, covered by the removable cover 23. This cavity is filled with materials such as Fe, Al, Mg and Cd in amounts sufficient to establish the response of the compensated density logging instrument's detectors at a point along the spine. For example, the following arrangement of materials in cavity 25 will provide a response that falls on the spine. Beginning at the bottom of cavity 25: 0.062 inch — Fe, 0.187 inch — Al, 0.406 inch — Mg, 0.094 inch — Al, 0.062 inch — Mg, 0.031 inch — Fe and 1.000 inch — Al. The materials may in the form of metal plates of a size just slightly smaller than the mouth of cavity 25 and of the aforementioned thicknesses. The cover 23 is removed, the plates stacked one on top of the other in cavity 25 and the cover again attached to hold the plates in position. A handle 26 is provided for carrying calibrator 21 and the curved bottom face 27 of calibrator 21 is shaped to fit against the face of the measuring instrument.

The calibrator 21 is small and light enough to be easily handled and may be carried to the well site. Calibrator 21 is smaller than a block that would look like an infinite medium to the compensated density logging instrument. For example, an aluminum block big enough to look like an infinite medium to the compensated density logging instrument would weigh over 600 lbs. whereas the aluminum block 21 weighs substantially less than 100 lbs. The approximate dimensions of calibrator 21 are 20 inches × 6 inches × 4 inches, thus being small enough to be easily handled.

The second calibrator may be constructed very similar to the aluminum calibrator, however the second calibrator is constructed of magnesium. The magnesium calibrator includes the structural elements shown in FIGS. 2 and 3 including the body 22, a removable cover 23, a cavity 25, curved face 27 and handle 26. The cavity 25 is filled with the following arrangement of materials from the bottom out: 0.062 inch — Mg, 0.031 inch — Al, 0.031 inch — Fe, 0.062 inch — Mg, 0.031 inch — Al, 0.031 inch — Fe, 0.093 inch — Al and 1.500 inches Mg. The materials may be in the form of metal plates of a size just slightly smaller than the mouth of cavity 25 and of the afore-mentioned thicknesses. It is to be understood that the calibrators could be constructed of other metals as long as they can be modified to provide detector responses that fall upon the spine by inserting various filter materials in cavity 25.

Referring now to FIG. 4, a compensated density logging instrument 28 is shown with one of the calibrators 29 of the present invention in position for calibration. The instrument 28 includes a gamma ray source 30, a short-spaced detector 31, a long-spaced detector 32, an extendable arm 33 that will keep the measuring section of instrument 28 in contact with the borehole during logging and the surface equipment associated with this logging instrument. The calibrator 29 is positioned on instrument 28 so that the cavity 34 is located over the short-spaced detector 31. With the cavity 34 in this position, gamma rays from source 30 that are scattered in calibrator 29 must travel through the filter material in cavity 34 to get to short-spaced detector 31. Also, part of the gamma rays that reach the long-spaced detector 32 travel through the material in cavity 34. The proper arrangement of material in cavity 34 results in a reduction in counting rate for both the long-spaced and short-spaced detectors and provides a point that falls on the spine.

One embodiment of the calibrators of the present invention having been described in detail, the method of calibration using said calibrators will now be considered with reference to FIGS. 1 and 4. The magnesium calibrator is first positioned on the compensated density logging instrument 28 in the position shown in FIG. 4. The logging system is adjusted until the output shows a density of 2.20 gm/cc on the log-log scale. This provides the first point 17 that will be used to establish spine 11. The magnesium calibrator is removed and the aluminum calibrator positioned on the logging instrument 28 in the position shown in FIG. 4. The logging system is adjusted until the output shows a density of 2.80 gm/cc on the log-log scale. This provides the second point 16 that will be used to establish the spine 11. The aluminum calibrator is removed and the magnesium calibrator again placed on the logging instrument 28, however, this time the magnesium calibrator is reversed 180° from the position of the calibrator 29 shown in FIG. 4. The logging system will now give a response that will locate point 18 and the rib angle can be established. The logging system is adjusted to locate point 20 at 2.48 gm/cc and the rib angle established. This procedure for calibrating the logging system is generally conducted both before and after the logging operation to insure that the system has not changed or drifted while logging.

The embodiments of the invention in which an exclusive property or privilege is claimed are defined as follows:

1. A method of calibrating a compensated density logging instrument by the establishment of a spine-and-ribs plot, comprising the steps of: providing a filter recess in a first calibration block, positioning an amount of filter material in said filter recess sufficient to cause the compensated density logging instrument to have a response that will produce a first point on the spine of the spine-and-ribs plot, providing a filter recess in a second calibration block, positioning an amount of filter material in said filter recess sufficient to cause said compensated density logging instrument to have a response that will produce a second point on the spine of the spine-and-ribs plot, positioning said first calibration block proximate the detector portion of the compensated density logging instrument, adjusting the compensated density logging instrument to produce an output coincident with said first point on the spine of the spine-and-ribs plot, removing said first calibration block from the compensated density logging instrument, positioning said second calibration block proximate the detector portion of the compensated density logging instrument, adjusting the compensated density logging instrument to produce an output coincident with said second point on the spine of the spine-and-ribs plots removing said second calibration block from the compensated density logging instrument, positioning one of the calibrators on the compensated density logging instrument in a 180° reversed position and adjusting the compensated density logging instrument to establish the ribs of the spine-and-ribs plot.

2. A calibrator for a compensated density logging instrument, comprising:
 a block of material to be positioned proximate the detector portion of said instrument when calibrating, said block being too small to appear to be an infinite medium to said instrument;
 a cavity in said block; and
 filter means in said cavity for establishing the response of the compensated density logging instrument on the spine of a spine-and-ribs plot.

3. The calibrator of claim 2 wherein said block is an aluminum block.

4. The calibrator of claim 2 wherein said block is a magnesium block.

5. Apparatus for calibrating a compensated density logging instrument, comprising:
 first block means adapted to be positioned proximate said instrument for establishing a point that falls on the spine of a spine-and-ribs plot, said block being too small to appear as an infinite medium to said instrument;
 a first cavity in said first block means;
 filter means in said first cavity for establishing the instrument's response on the spine of a spine-and-ribs plot;
 second block means adapted to be positioned proximate said instrument for establishing a second point that falls on the spine of a spine-and-ribs plot, said block being too small to appear as an infinite medium to said instrument;
 a second cavity in said second block means; and
 filter means in said second cavity for establishing the instrument's response on the spine of a spine-and-ribs plot.

6. The apparatus of claim 5 wherein said first block means is an aluminum block and said second block means is a magnesium block.

7. A calibrator for calibrating a compensated density logging instrument by establishing a spine-and-ribs plot, comprising:
 a metal block weighing less than 100 pounds;
 a cavity in said metal block; and filter means in said cavity for establishing the response of the compensated density logging instrument on the spine of a spine-and-ribs plot.

8. The calibrator of claim 7 wherein said metal block is an aluminum block.

9. The calibrator of claim 7 wherein said metal block is a magnesium block.

* * * * *